(12) United States Patent
Leung

(10) Patent No.: US 11,785,446 B2
(45) Date of Patent: *Oct. 10, 2023

(54) END-TO-END RATE ADAPTATION USING RAN ASSISTED RATE ADAPTATION

(71) Applicant: QUALCOMM Incorporated, San Diego, CA (US)

(72) Inventor: Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,171

(22) Filed: May 11, 2022

(65) Prior Publication Data

US 2022/0272524 A1 Aug. 25, 2022

Related U.S. Application Data

(63) Continuation of application No. 16/406,866, filed on May 8, 2019, now Pat. No. 11,350,268.

(Continued)

(51) Int. Cl.
*H04W 8/24* (2009.01)
*H04W 28/02* (2009.01)
(Continued)

(52) U.S. Cl.
CPC ......... *H04W 8/24* (2013.01); *H04W 28/0268* (2013.01); *H04W 28/22* (2013.01); *H04W 80/10* (2013.01); *H04W 88/08* (2013.01)

(58) Field of Classification Search
CPC ... H04W 8/24; H04W 28/0268; H04W 28/22; H04W 80/10; H04W 88/08
See application file for complete search history.

(56) References Cited

U.S. PATENT DOCUMENTS

| | | | |
|---|---|---|---|
| 2004/0057412 A1* | 3/2004 | Curcio | H04W 28/18 370/468 |
| 2004/0267956 A1* | 12/2004 | Leon | H04L 65/80 370/395.6 |

(Continued)

FOREIGN PATENT DOCUMENTS

CN 101971629 A 2/2011

OTHER PUBLICATIONS

"3rd Generation Partnership Project; Technical Specification Group Services and System Aspects; IP Multimedia Subsystem (IMS); Multimedia Telephony; Media handling and interaction (Release 15)", 3GPP Standard; Technical Specification; 3GPP TS 26.114, 3rd Generation Partnership Project (3GPP), Mobile Competence Centre ; 650, Route Des Lucioles ; F-06921 Sophia-Antipolis Cedex ; France, vol. SA WG4, No. V15.2.0, Mar. 29, 2018 (Mar. 29, 2018), 399 pages, XP051450686, [retrieved on Mar. 29, 2018].

(Continued)

*Primary Examiner* — Jael M Ulysse
(74) *Attorney, Agent, or Firm* — Sevan Savsa; ArentFox Schiff LLP

(57) ABSTRACT

Aspects of the present disclosure provide techniques for end-to-end rate adaptation using radio access network (RAN) assisted rate adaptation. Particularly, when a user equipment (UE) risks operating at rates greater than the guaranteed bit rates (GBR), the UE may rely on rate adaptation mechanisms to indicate when it has exceeded the supported bandwidth such that the UE may reduce its rate accordingly. Specifically, in some examples, a network device (e.g., call session control function (CSCF) and/or policy and charging rules function (PCRF)) may configure endpoints in an end-to-end communication to operate at rates that exceed GBR based on determining that all endpoints support RAN assisted rate adaptation capability. In other examples, the network device may configure maxi- (Continued)

mum bit rates (MBR) that exceed GBR for only the endpoint that supports RAN assisted rate adaptation capability.

23 Claims, 8 Drawing Sheets

Related U.S. Application Data

(60) Provisional application No. 62/673,378, filed on May 18, 2018.

(51) Int. Cl.
*H04W 88/08* (2009.01)
*H04W 28/22* (2009.01)
*H04W 80/10* (2009.01)

(56) References Cited

U.S. PATENT DOCUMENTS

| | | | | |
|---|---|---|---|---|
| 2006/0165126 | A1* | 7/2006 | Petersson | H04W 28/22 370/332 |
| 2006/0182065 | A1* | 8/2006 | Petrovic | H04W 28/02 370/332 |
| 2007/0025301 | A1* | 2/2007 | Petersson | H04L 47/193 370/338 |
| 2008/0170504 | A1* | 7/2008 | Petrovic | H04W 28/18 370/235 |
| 2008/0205358 | A1* | 8/2008 | Jokela | H04L 47/12 370/338 |
| 2010/0195521 | A1* | 8/2010 | Wanstedt | H04W 8/04 370/252 |
| 2010/0238805 | A1* | 9/2010 | Ludwig | H04W 28/0268 370/236 |
| 2010/0284278 | A1* | 11/2010 | Alanara | H04L 47/263 370/235 |
| 2011/0141890 | A1* | 6/2011 | Giaretta | H04W 28/20 370/232 |
| 2011/0179186 | A1* | 7/2011 | Li | H04L 65/752 709/231 |
| 2011/0310737 | A1* | 12/2011 | Klingenbrunn | H04W 36/0044 370/235 |
| 2012/0089740 | A1* | 4/2012 | Yin | H04N 21/64792 709/227 |
| 2013/0114497 | A1* | 5/2013 | Zhang | H04W 72/04 370/312 |
| 2013/0286879 | A1* | 10/2013 | ElArabawy | H04N 21/26208 370/252 |
| 2014/0105026 | A1* | 4/2014 | Wanstedt | H04L 47/22 370/236 |
| 2014/0219230 | A1* | 8/2014 | Schierl | H04W 28/20 370/329 |
| 2015/0009826 | A1* | 1/2015 | Ma | H04W 72/569 370/235 |
| 2017/0164238 | A1* | 6/2017 | Paredes Cabrera | H04W 28/22 |
| 2017/0332282 | A1* | 11/2017 | Dao | H04L 1/0002 |
| 2017/0374579 | A1* | 12/2017 | Wang | H04W 28/0278 |
| 2019/0037001 | A1* | 1/2019 | Fujishiro | H04L 1/0009 |
| 2019/0215729 | A1* | 7/2019 | Oyman | H04L 65/1016 |
| 2019/0261234 | A1* | 8/2019 | Park | H04W 36/0069 |
| 2019/0357036 | A1 | 11/2019 | Leung | |

OTHER PUBLICATIONS

International Preliminary Report on Patentability—PCT/US2019/031571, The International Bureau of WIPO—Geneva, Switzerland, dated Dec. 3, 2020.

International Search Report and Written Opinion—PCT/US2019/031571—ISA/EPO—dated Jul. 29, 2019.

Kyocera: "Remaining issues in RAN-assisted codec rate adaptation", 3GPP Draft; R2-164985_EVOLTE, 3rd Generation Partnership Project (3GPP), Mobile Competence Centre ; 650, Route Des Lucioles ; F-06921 Sophia-Antipolis Cedex; France, vol. RAN WG2, No. Gothenburg, Sweden; Aug. 22, 2016-Aug. 26, 2016, Aug. 21, 2016 (Aug. 21, 2016), XP051126630, Retrieved from the Internet: URL:http://www.3gpp.org/ftp/Meetings_3GPP_SYNC/RAN2/Docs/ [retrieved on Aug. 21, 2016].

Qualcomm Incorporated: "End-to-End Rate Adaptation Using RAN Assisted Rate Adaptation", SA4 MTSI SWG conf. call on FS_5G_MEDIA_MTSI, S4-AHM415, 3rd Generation Partnership Project (3GPP), Mobile Competence Centre, 650, Route Des Lucioles, F-06921 Sophia-Antipolis Cedex, France, vol. SA WG4, No. conf. call, May 29, 2018, May 24, 2018, 5 Pages, XP051542014.

* cited by examiner

END-TO-END RATE ADAPTATION USING RAN ASSISTED RATE ADAPTATION

CROSS-REFERENCE TO RELATED APPLICATION(S)

This application is a Continuation of U.S. patent application Ser. No. 16/406,866, entitled "End-to-End Rate Adaptation Using RAN assisted Rate Adaptation" and filed May 8, 2019, which claims benefit of U.S. Provisional Application Ser. No. 62/673,378, entitled "End-to-End Rate Adaptation Using RAN assisted Rate Adaptation" and filed May 18, 2018, which is expressly incorporated by reference herein in its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, long term evolution (LTE) and 5G new radio (NR) communications technology expand and support diverse usage scenarios and applications with respect to current mobile network generations. In an aspect, wireless communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information.

As the demand for mobile broadband access continues to increase, however, there exists a need for further improvements in communications technology and beyond. For example, users now demand even greater connectivity for their mobile devices.

SUMMARY

Aspects of the present disclosure provide techniques for end-to-end rate adaptation using radio access network (RAN) assisted rate adaptation. Particularly, when a user equipment (UE) risks operating at rates greater than the guaranteed bit rates (GBR), the UE may rely on rate adaptation mechanisms to indicate when it has exceeded the supported bandwidth such that the UE may reduce its rate accordingly. Specifically, in some examples, a network device (e.g., call session control function (CSCF) and/or policy and charging rules function (PCRF)) may configure endpoints in an end-to-end communication to operate at rates that exceed GBR based on determining that all endpoints support RAN assisted rate adaptation capability. In other examples, the network device may configure maximum bit rates (MBR) that exceed GBR for only the endpoint that supports RAN assisted rate adaptation capability.

In one example, a method and apparatus for wireless communication implemented by a network device (e.g., CSCF and/or PCRF) is disclosed. The method may include determining, at a network device, whether a first endpoint of an end-to-end communication supports RAN assisted rate adaptation capability, wherein the first endpoint includes a first UE associated with a first base station. The method may further include determining whether a second endpoint of the end-to-end communication supports the RAN assisted rate adaptation capability, wherein the second endpoint includes a second UE associated with a second base station. The method may further include configuring the first end point with a maximum bit rate (MBR) that exceeds a guaranteed bit rate (GBR) based on determining that either both the first endpoint and the second endpoint supports the RAN assisted rate adaptation capability or if the first endpoint supports the RAN assisted rate adaptation capability.

In another example, a method for wireless communication implemented by a UE is disclosed. In some examples, the method may include determining, at a UE, whether the UE supports RAN assisted rate adaptation capability, wherein the RAN assisted rate adaptation capability allows the UE to operate at bit rates that exceed GBR. The method may further include configuring a session description protocol (SDP) parameter that indicates the RAN assisted rate adaptation capabilities of the UE, and transmitting a SDP message that includes the SDP parameter to a network device.

In another example, user equipment (UE) for wireless communications is disclosed. The UE may comprise a memory configured to store instructions and a processor communicatively coupled with the memory. The processor may be configured to execute the instructions to determine, at the UE, whether the UE supports RAN assisted rate adaptation capability, wherein the RAN assisted rate adaptation capability allows the UE to operate at bit rates that exceed GBR. The processor may further configure a SDP parameter that indicates the RAN assisted rate adaptation capabilities of the UE, and transmit a SDP message that includes the SDP parameter to a network device.

In another example, a non-transitory computer readable medium storing code for wireless communications is disclosed. The code comprising instructions may be executable by a processor for determining, at a UE, whether the UE supports RAN assisted rate adaptation capability, wherein the RAN assisted rate adaptation capability allows the UE to operate at bit rates that exceed GBR. The code may further comprise instructions for configuring a SDP parameter that indicates the RAN assisted rate adaptation capabilities of the UE, and transmitting a SDP message that includes the SDP parameter to a network device.

In another example, an apparatus for wireless communications is disclosed. The apparatus may include means for determining, at a UE, whether the UE supports RAN assisted rate adaptation capability, wherein the RAN assisted rate adaptation capability allows the UE to operate at bit rates that exceed GBR. The apparatus may further include means for configuring a SDP parameter that indicates the RAN assisted rate adaptation capabilities of the UE, and means for transmitting a SDP message that includes the SDP parameter to a network device.

In another example, a method and apparatus for wireless communication implemented by a base station is disclosed. The method may include determining, at a base station, whether the base station supports RAN assisted rate adaptation capability, wherein the RAN assisted rate adaptation capability allows the base station to control traffic when a UE associated with the base station operates at bit rates that exceeds GBR. The method may further include transmitting a notification to the UE indicating whether the base station supports the RAN assisted rate adaptation capability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
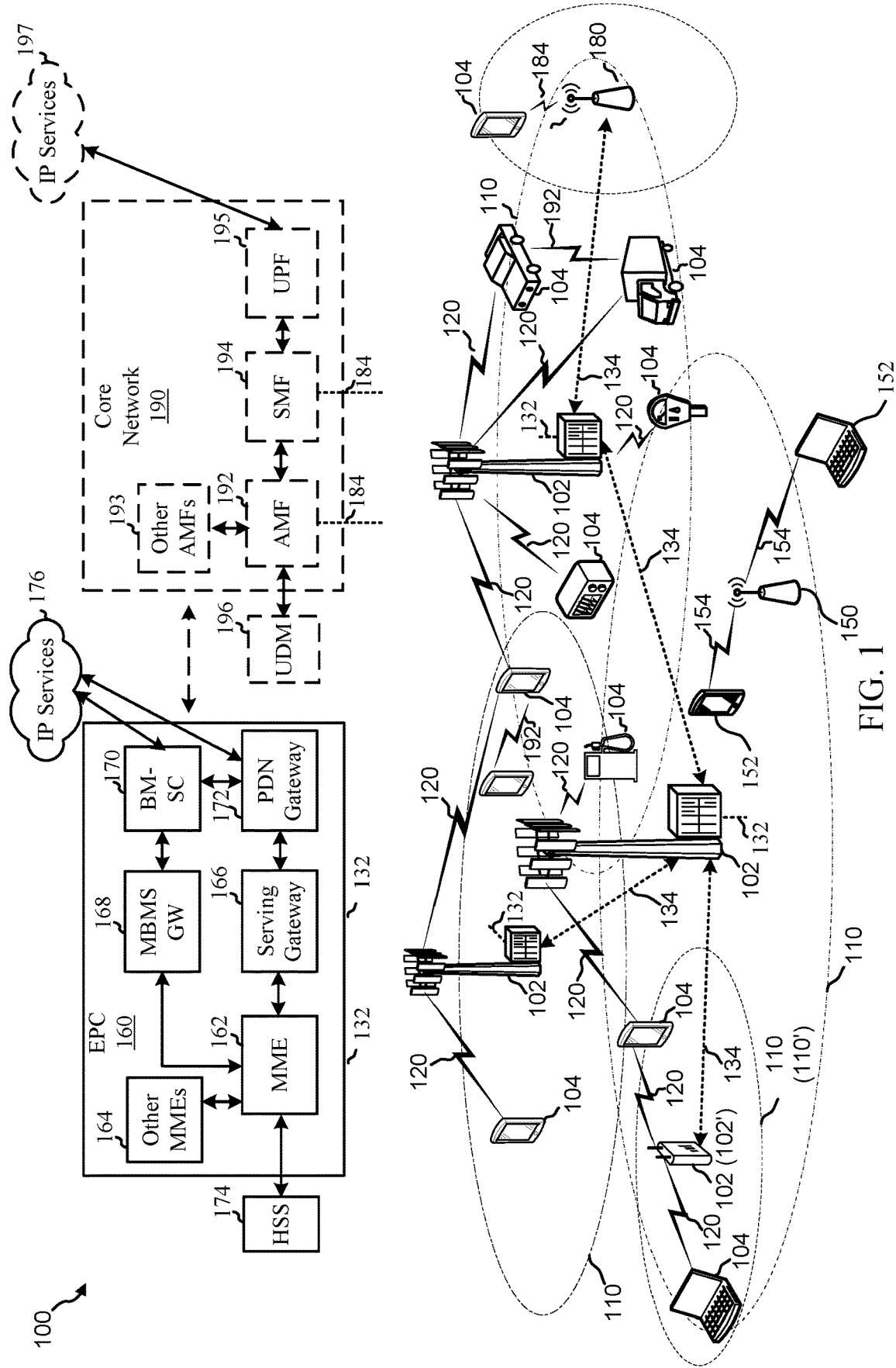
FIG. 1 illustrates an example of a wireless communications system in accordance with aspects of the present disclosure.

As discussed above, in some instances, a UE may operate at rates (e.g., downlink and uplink) at rates that exceed the guaranteed bit rate (GBR) that may be set by the network as the bandwidth that may be supported. However, operating at rates that exceed GBR may risk packet loss or delay on the communication link due to the network's inability to handle the bit rates. When a UE risks operating at rates that exceed GBR, the UE may generally rely on rate adaptation mechanisms to indicate when the UE has exceeded the supported bandwidth. There may be multiple mechanisms that may trigger a media receiver (e.g., receiver UE) to request that the media sender (e.g., transmitting UE) reduce its rate, including for example: (1) the UE receiver may experience packet loss, jitter, or delay in excess of a predetermined threshold, (2) the UE may receive an indication that the MBR has been reduced below the current transmission rate, (3) the UE receiver may detect packets with explicit congestion notification—congestion experienced (ECN-CE) markings, and (4) the UE may receive an access node bit rate (ANBR) message indicating that the downlink (or uplink) rate needs to be reduced. In some situations, the media sender (e.g., transmitting UE) may also receive an ANBR from the corresponding base station that the transmitting UE should reduce the uplink transmission rates. As such, when determining what rate to transmit at above GBR, the UE can adjust the aggressiveness of its algorithms based on knowing which of the above mechanisms are supported by the wireless communication system (e.g., supported by the access network, the other UE, and the core network).

In current systems, however, there is no mechanism for the UE, for example, to determine whether the far endpoint (e.g., receiver UE or base station) supports the RAN assisted rate adaptation. With the lack of end-to-end information, the wireless system is unable to efficiently implement RAN assisted rate adaptation. Features of the present disclosure allow the network devices (e.g., CSCF and/or PCRF), endpoint UEs (e.g., first endpoint UE and second endpoint UE), and the endpoint base stations (e.g., first endpoint base station and second endpoint base station) in an end-to-end communication to determine whether one or more devices on the communication link support the RAN assisted rate adaptation capability by implementing a session description protocol (SDP) parameter.

Specifically, in some instances, a first endpoint (e.g., first UE and corresponding first base station) may determine whether the associated first UE and first base station supports an ANBR messages (e.g., RAN assisted rate adaptation capability). If both devices of the first endpoint support RAN assisted rate adaptation capability, the first UE may transmit an SDP message (e.g., SDP offer message) that may include an SDP parameter to the second endpoint (e.g., second UE and second base station). The SDP offer message and SDP parameter may indicate to the second endpoint that the first endpoint supports RAN assisted rate adaptation capability. In response, the second UE, as part of the second endpoint, may determine whether the second UE and the second base station also support RAN assisted rate adaptation capability. If so, the second UE may respond with SDP answer message that may include SDP parameter (e.g., a=rara parameter) back to the first UE. In between (on the communication link), the SDP offer and SDP answer messages may be received by network devices (e.g., CSCF/PCRF) that may be associated with the operator network. The network devices may determine whether the first endpoint and the second endpoint support RAN assisted rate adaptation capability. If both endpoints support RAN assisted rate adaptation capability, the network device may configure the first UEs and the second UEs to operate at MBR that exceeds the GBR. In limited examples, if only one endpoint supports RAN assisted rate adaptation capability, the network device may configure the MBR that exceeds GBR for the endpoint that supports RAN assisted rate adaptation capability. Specifically, the network devices (e.g., PCRF) may use the presence of the SDP parameter in the SDP offer or SDP Answer to determine whether the network device could set MBR that exceeds GBR with high level of confidence. For example, the network devices may set MBR much higher in cases where the presence of the SDP parameter indicates RAN assisted rate adaptation is supported throughout the system and set MBR lower if some parts of the system do not support rate adaptation. Similarly, the UE may use the presence of the SDP parameter in the SDP messages to select an adaptation algorithms when operating at rates that exceed GBR. Features of the present disclosure provide advantages over conventional systems because current systems do not allow end-to-end rate adaptation based on knowledge as to whether all endpoints support RAN assisted RATE adaptation.

Various aspects are now described in more detail with reference to the FIGS. 1-8. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160 and a core network 190.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with core network 190 and/or EPC 160 through backhaul links 132, 134, 184, which may be wired or wireless. In an aspect, for example, an EN-DC configuration may utilize an LTE master cell group (MCG) and EPC 160 to support communications between the UE 104 and base stations 102 configured for 5G NR. The base stations 102 configured for 5G NR may establish a backhaul link (e.g., 51 bearer) directly with the serving gateway 166 of the EPC or via a master eNB (i.e., a base station 102 configured for 4G LTE). Accordingly, a UE 104 may establish a 5G NR connection with a 5G access network even if a 5GC is not deployed. Although the following description may be focused on 5G NR and LTE, the concepts described herein may be applicable to other similar areas, such as, LTE-A, CDMA, GSM, and other wireless technologies.

In some examples, the wireless communications system may also include the core network 190 that may provide user authentication, access authorization, tracking, internet protocol (IP) connectivity, and other access, routing, or mobility functions. The core network 130 may allow circuit-switched connectivity to the back-end operator network (e.g., public land mobile network (PLMN) and/or packet-switched connectivity to private networks, operator's intranet or to the public internet. The core network 190 may also include call session control function (CSCF) which may be a collection of functional capabilities that play an essential role in the core network. Additionally or alternatively, the core network 130 may include policy and charging rules function (PCRF) that supports service data flow detection, policy enforcement and flow-based charging. The CSCF and PCRF may collectively may be described as "network device" for purposes of this disclosure (see FIG. 2).

In one or more examples, the one or more UEs 104 may include communication management component 350 (see FIG. 3) for generating session description protocol (SDP) messages (e.g., SDP offers or answers) that include parameters that indicate whether the endpoint (e.g., the UE 104 and the associated base station 102) support RAN assisted rate adaptation capability. In some examples, the UE 104 may be able to determine whether the base station 102 associated with the UE 104 supports RAN assisted rate adaptation capability by explicit capability notification messages received from the base station 102. Specifically, the base station 102 may include a capability management component 550 (see FIG. 5) that generates notifications to the UE 104 indicating whether the base station 102 as one part of the end-to-end communication supports RAN assisted rate adaptation capability. Further, in some examples, the network device that may be part of the core network 130 may include an end-to-end rate adaptation management component 750 (see FIG. 7) for determining whether to configure MBR that exceeds GBR for one or more endpoints in an end-to-end communication based on determination that either both or at least one endpoint (i.e., a UE 104 and/or base station 102) supports RAN assisted rate adaptation capability. Specifically, the end-to-end rate adaptation management component 750 may monitor message exchange between a first endpoint (e.g., first UE 104 and first base station 102) and a second endpoint (e.g., second UE 104 and second base station 102) to identify RAN assisted rate adaptation capabilities of both endpoints (e.g., first and second UEs 104 and first and second base stations 102) based on SDP offer and answer messages.

The base stations 102 may include macro cells (high power cellular base station) and/or small cell base stations (low power cellular base station). The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) or eNodeB (eNB) 180 (one or both of gNB and eNB may also be referred to as "base station") may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. It should be appreciated by those of ordinary skill in the art that the present invention is not just limited to mmW, but may also include any other frequencies used for wireless communication. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC may include a Mobility Management Entity (MME), other MMES 164, a Serving Gateway, a Multimedia Broadcast Multicast Service (MBMS) Gateway 168, a Broadcast Multicast Service Center (BM-SC), and a Packet Data Network (PDN) Gateway. The MME may be in communication with a Home Subscriber Server (HSS) 174. The MME is the control node that processes the signaling between the UEs 104 and the EPC. Generally, the MME provides bearer and connection management. All user Internet protocol (IP) packets are transferred through the Serving Gateway, which itself is connected to the PDN Gateway. The PDN Gateway provides UE IP address allocation as well as other functions. The PDN Gateway 172 and the BM-SC are connected to the IP Services. The IP Services may include the Internet, an intranet, an IP Multimedia Subsystem (IMS), a PS Streaming Service, and/or other IP services. The BM-SC may provide functions for MBMS user service provisioning and delivery. The BM-SC may serve as an entry point for content provider MBMS transmission, may be used to authorize and initiate MBMS Bearer Services within a public land mobile network (PLMN), and may be used to schedule MBMS transmissions. The MBMS Gateway may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, the wireless communication system may be a mmW communication system. In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked UE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in a mmW communication system may be very short (e.g., 150-200 meters between gNBs). The short distances may result in a short amount of time required for a handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield act as obstacles to maintaining the LOS.

One way to overcome LOS issues is by using CV2X technologies. In CV2X technology, a vehicle can communicate with at least one of one or more cellular networks, one or more vehicles, and/or one or more cellular configured devices. To communicate with other devices the CV2X technology may use antennas that are compatible with mmW communication systems.

In certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104 may advertise CV2X services supported by the host UE 104. A client UE 104 may discover CV2X services supported by the host UE 104. Moreover, a UE 104 may act as both a host and a client. For example, a vehicle may act as a host to provide speed and braking updates to surrounding vehicles and act as a client to communicate with a tolling station. Accordingly, a single UE 104 may include both a host discovery component and a client discovery component.

Figure 2:
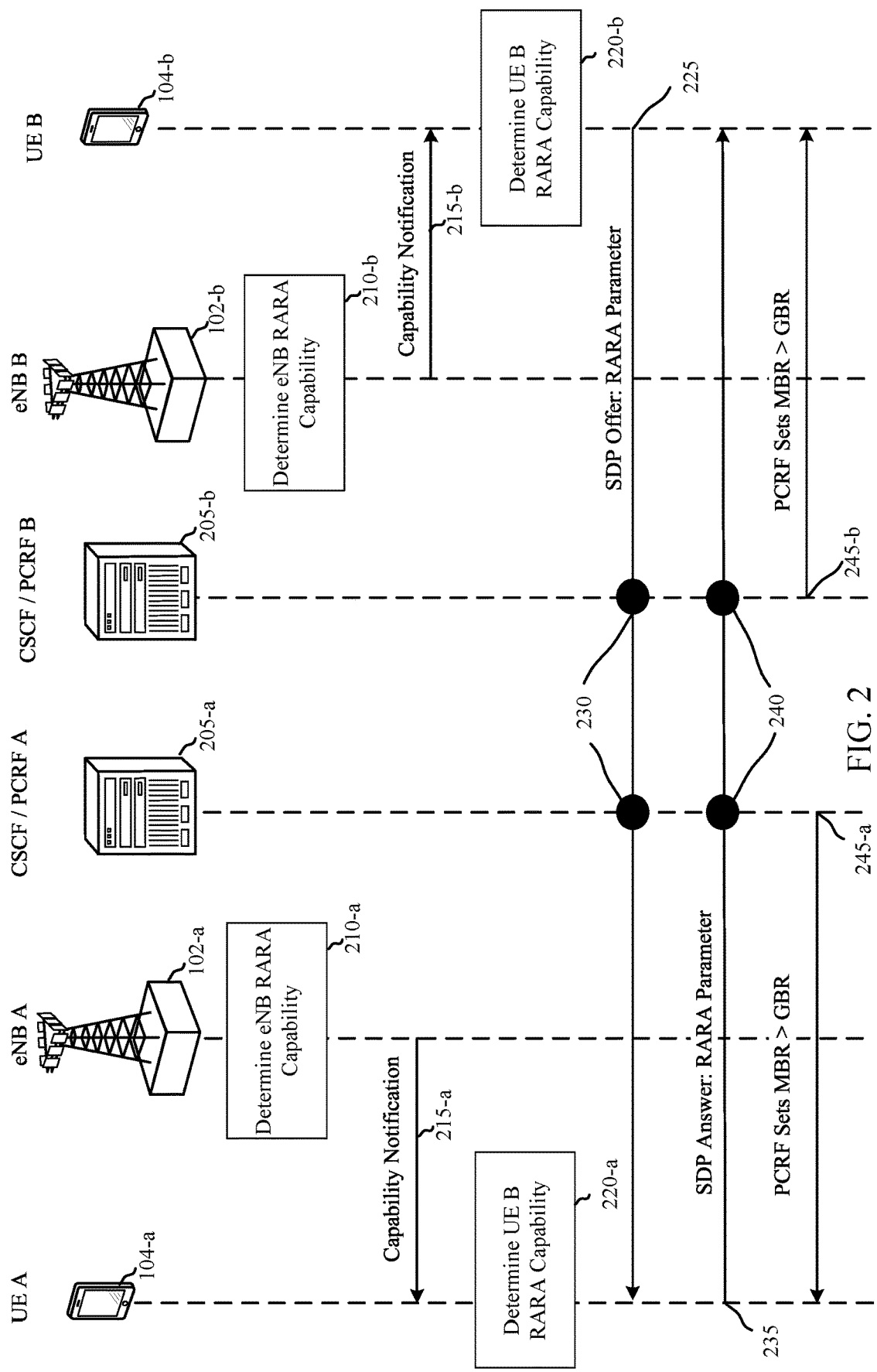
FIG. 2 illustrates an example of the call flow for end-to-end communication in accordance with aspects of the present disclosure.

FIG. 2 is a call flow diagram 200 for end-to-end communication that allows network devices (e.g., CSCF/PCRF) to configure bit rates that exceed GBR based on whether the endpoints support RAN assisted rate adaptation capability. The call flow diagram 200 may include at least first end point of an end-to-end communication that may include first UE 104-*a* and first base station 102-*a* in communication with the first network device 205-*a* (e.g., CSCF/PCRF A). The diagram 200 may also include a second end point of the end-to-end communication that may include a second UE 104-*b*, a second base station 102-*b*, and a second network device 205-*b* (e.g., CSCF/PCRF B).

As noted above, in some instances, the UEs 104 may communicate (e.g., for downlink and uplink) at bit rates that exceed the GBR set by the network. This may be possible because although the network may provide a specified bandwidth to the UE 104 (e.g., GBR), the network may be configured to process rates that exceed the GBR when overall traffic allows (e.g., low demand by other UEs). As such, in some situations, the UEs 104 may be able to communicate at a MBR that exceeds the GBR. Doing so, however, may risk potential packet drops or delays if the network is unable to handle the greater bit rate. The RAN assisted rate adaptation technique allows to control and/or adjust the bit rates for the UE 104 when the UE 104 is operated at rates that exceed the GBR. Specifically, when the base station 102 experiences or detects congestion, the base station 102 may transmit a notification to the UE 104 requesting the UE 104 to reduce the operating rate.

In order for implementation for this functionality, however, the network may need to determine whether all end points in an end-to-end communication support the RAN assisted rate adaptation capability. If one or more endpoints fails to support the RAN assisted rate adaptation capability, the network may risk packet loss or delay. As such, at block 210, the base stations 102 (e.g., first base station 102-*a* and second base station 102-*b*) may respectively determine whether the base station 102 supports the RAN assisted rate adaptation capability. As noted above, the RAN assisted rate adaptation capability may allow the base station 102 to control communication rates when the UE 104 associated with the base station 102 operates at bit rates that exceed GBR by allowing the base station 104 to provide explicit indication of the uplink and downlink rates that may be supported, and thus enabling faster and more accurate rate adaptation for the wireless communications system. Once, the base stations 102 determine that the RAN assisted rate adaptation capability is supported, the base stations 102, at 215, may transmit a notification to the UEs 104 that indicate whether the base station (e.g., first base station 102-*a* and/or second base station 102-*b*) supports the RAN assisted rate adaptation capability.

Upon receiving notification from the base stations 102, the UEs 104, at 220, may determine whether each UE 104 (e.g., first UE 104-*a* and second UE 104-*b*) supports the RAN assisted rate adaptation capability. Based on the determination, the second UE 104-*a*, for example, may generate a session description protocol (SDP) parameter that indicates whether the second endpoint (e.g., second UE 104-*a* and second base station 102-*b*) supports the RAN assisted rate adaptation capability. At 225, the second UE 104-*a* may transmit a SDP message that may be an example of a SDP offer message that includes the SDP parameter to the first UE 104-*a*.

During the transmission of the SDP message, the SDP offer message may be received and detected by the first network device 205-*a* and the second network device 205-*b*. Accordingly, the network devices 205 may determine whether the second endpoint of an end-to-end communication supports the RAN assisted rate adaptation capability.

At 235, the first UE 104-*a*, upon receiving the SDP offer that includes the SDP parameter indicating support for the RAN assisted rate adaptation capability, may transmit a SDP answer message that also include the RAN assisted rate adaptation capability parameter indicating that the first endpoint (e.g., first UE 104-*a* and first base station 104-*a*) also supports the RAN assisted rate adaptation capability. At 240, the SDP answer may be detected by the first network device 205-*a* and the second network device 205-*b* that may determine whether the first endpoint of an end-to-end communication supports the RAN assisted rate adaptation capability.

At 245, the network devices 205 may configure the first endpoint and/or the second endpoint with a MBR that exceeds a GBR based on determining that both the first end point and the second endpoint support the RAN assisted rate adaptation capability. In limited examples, the network devices 205 may configure the MBR to exceed the GBR for the endpoint that supports the RAN assisted rate adaptation capability even if the second endpoint fails to support the RAN assisted rate adaptation capability. For example, if the network devices 205 determine (based on SDP messages) that the first endpoint (e.g., first UE 104-*a* and first base station 102-*a*) supports the RAN assisted rate adaptation capability while the second endpoint (e.g., second UE 104-*b* and the second base station 102-*b*) fails to support the RAN assisted rate adaptation capability, the first network device 205-*a* may configure the first endpoint with MBR that exceeds the GBR such that the first UE 104-*a* may transmit (uplink) or receive (downlink) at rates that exceed greater than GBR. However, in this situation, the second network device 205-*b* may elect to omit configuring the bit rates that exceed GBR for the second endpoint.

Figure 3:
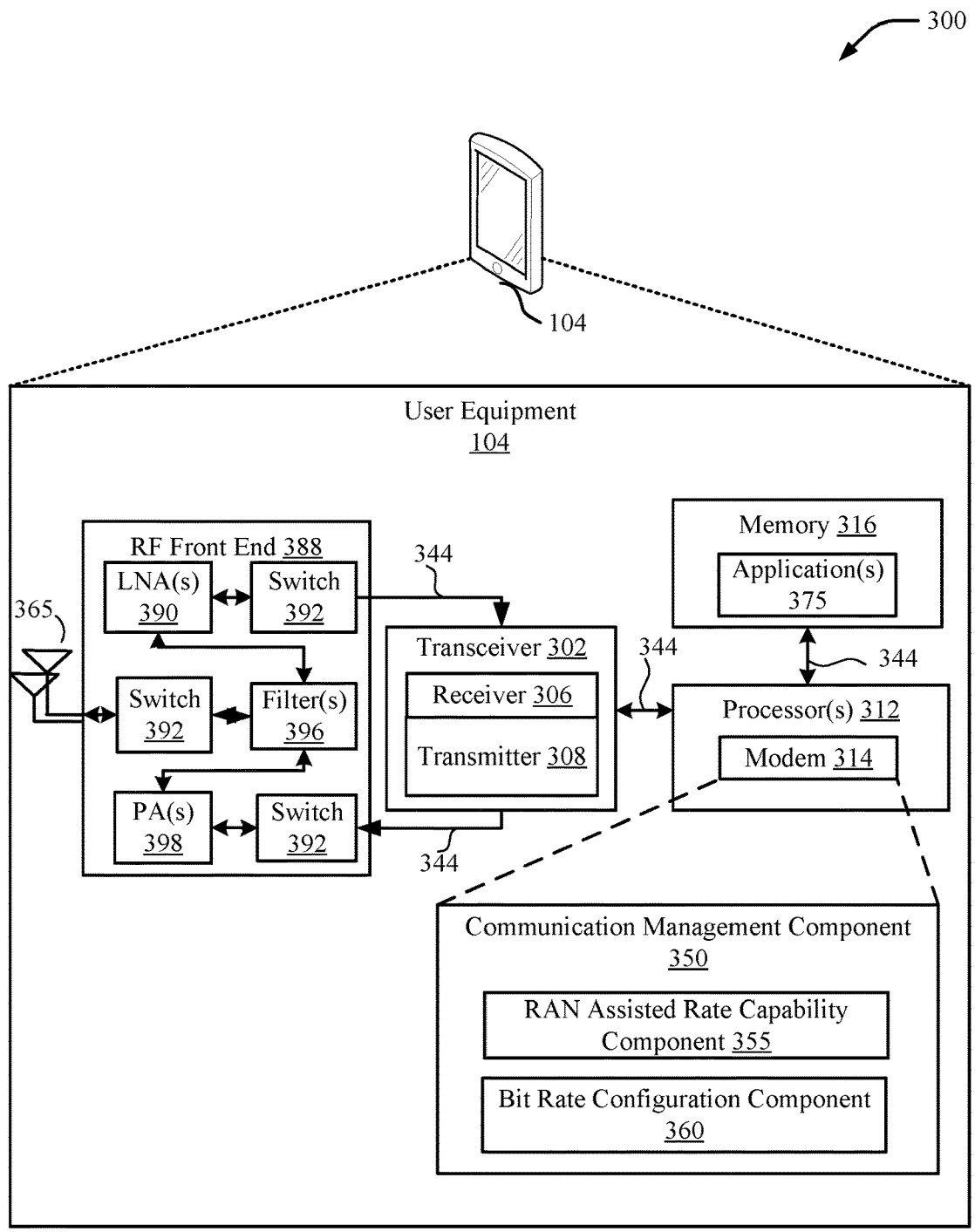
FIG. 3 illustrates an example of a schematic diagram of an aspect of an implementation of various components of a UE in accordance with various aspects of the present disclosure.

FIG. 3 illustrates a hardware components and subcomponents of a device that may be a UE 104 for implementing one or more methods (e.g., method 400) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the communication management component 350 to perform functions described herein related to including one or more methods (e.g., 400) of the present disclosure.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

The memory 316 may be configured to store data used herein and/or local versions of application(s) 375 or communication management component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining communication management component 350 and/or one or more of its subcomponents, and/or data associated therewith, when the UE 104 is operating at least one processor 312 to execute communication management component 350 and/or one or more of its subcomponents.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. An antenna 365 may be one or more antennas, antenna elements and/or antenna arrays. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 388. In an aspect, the transceiver 302 may be tuned to operate at specified frequencies such that transmitting device can communicate with, for example, one or more base stations 102 or one or more cells associated with one or more base stations 102. In an aspect, for example, the modem 314 can configure the transceiver 302 to operate at a specified frequency and power level based on the configuration of the transmitting device and the communication protocol used by the modem 314.

In an aspect, the modem 314 can be a multiband-multimode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
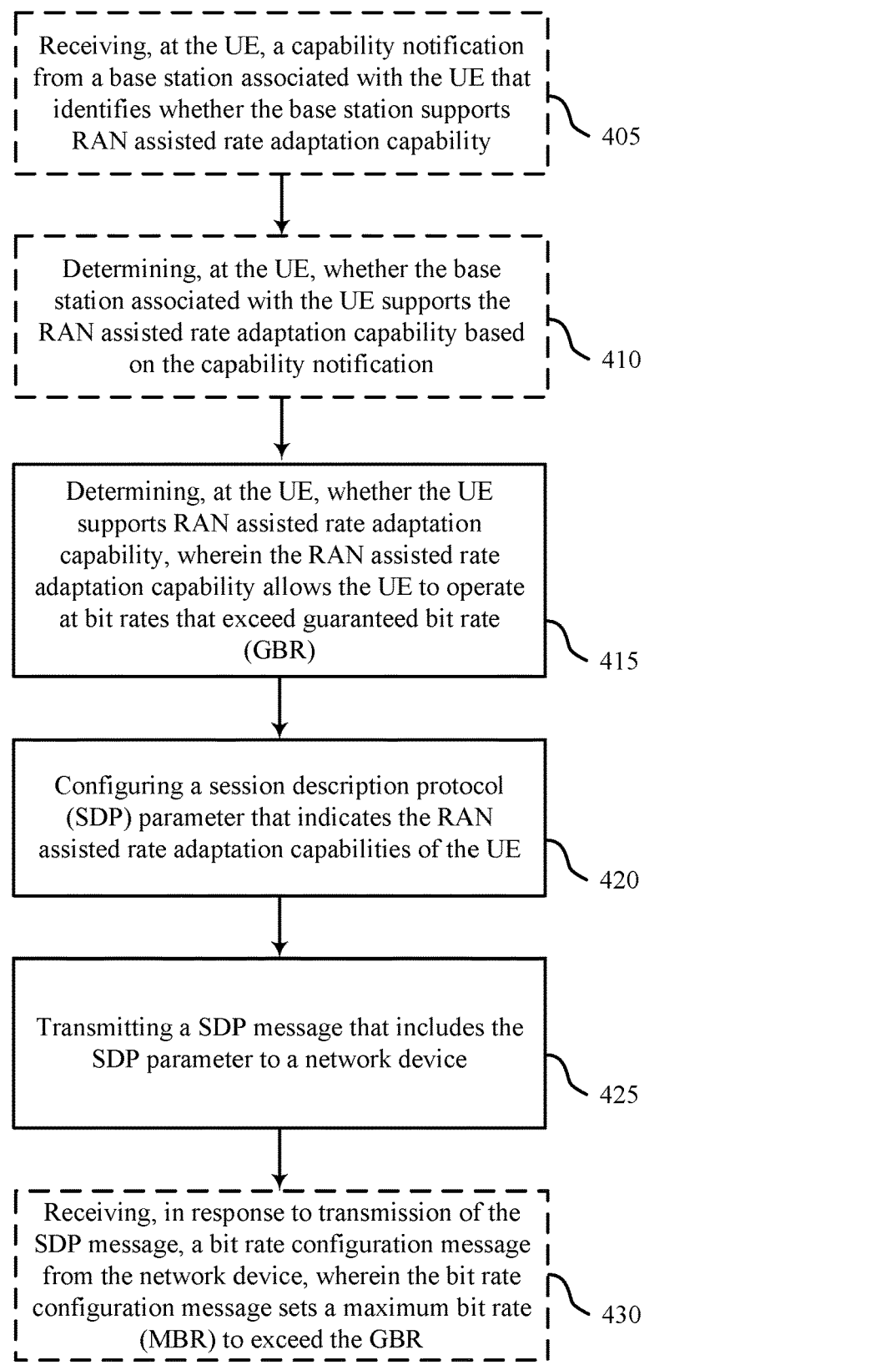
FIG. 4 illustrates an example of a method of wireless communication implemented by the UE in accordance with aspects of the present disclosure.

FIG. 4 is a flowchart of an example method 400 for wireless communications in accordance with aspects of the present disclosure. The method 400 may be performed using the UE 104. Although the method 400 is described below with respect to the elements of the UE 104, other components may be used to implement one or more of the steps described herein.

At block 405, the method 400 may optionally include receiving, at the UE, a capability notification from a base station or a network entity associated with the UE that identifies whether the base station supports RAN assisted rate adaptation capability. Aspects of block 405 may be performed by transceiver 302 described with reference to FIG. 3.

At block 410, the method 400 may further optionally include determining, at the UE, whether the base station associated with the UE supports the RAN assisted rate adaptation capability based on the capability notification. Aspects of block 410 may be performed by communication management component 350 and more particularly the RAN assisted rate capability component 355 as described with reference to FIG. 3.

At block 415, the method 400 may include determining, at the UE, whether the UE supports the RAN assisted rate adaptation capability. The RAN assisted rate adaptation capability may allow the UE to operate at bit rates that exceed GBR. In some examples, determination whether the UE supports RAN assisted rate adaptation capability may be based on a determination whether the UE is configured to process access node bit rate (ANBR) messages from the base station that may instruct the UE 104 to reduce one or both of uplink or downlink bit rate during communication when the bit rate exceeds GBR. In some examples, the ANBR messages may be transmitted by the base station when the base station is experiencing congestion on the network. Aspects of block 415 may be performed by RAN assisted rate capability component 355 as described with reference to FIG. 3.

At block 420, the method 400 may include configuring a SDP parameter that indicates the RAN assisted rate adaptation capabilities of the UE and in some instance, the base station associated with the UE. Aspects of block 420 may be performed by RAN assisted rate capability component 355 as described with reference to FIG. 3.

At block 425, the method 400 may include transmitting a SDP message that includes the SDP parameter to a network device. In some examples, the SDP message may be an SDP offer message. In other examples, the SDP message may be SDP answer message transmitted by the UE in response to a SDP offer message received from a UE indicating that the UE and the corresponding base station support the RAN assisted rate adaptation capability. Aspects of block 425 may be performed by transceiver 302 described with reference to FIG. 3.

At block 430, the method 400 may optionally include receiving, in response to transmission of the SDP message, a bit rate configuration message from the network device, wherein the bit rate configuration message sets a MBR to exceed the GBR. In some examples, the UE 104 may be a data source (e.g., media generator) and transmits the data at the bit rate set by the network device (e.g., bit rates that exceed GBR based on the bit rate configuration messages). Aspects of block 430 may be performed by bit rate configuration component 360 as described with reference to FIG. 3.

Figure 5:
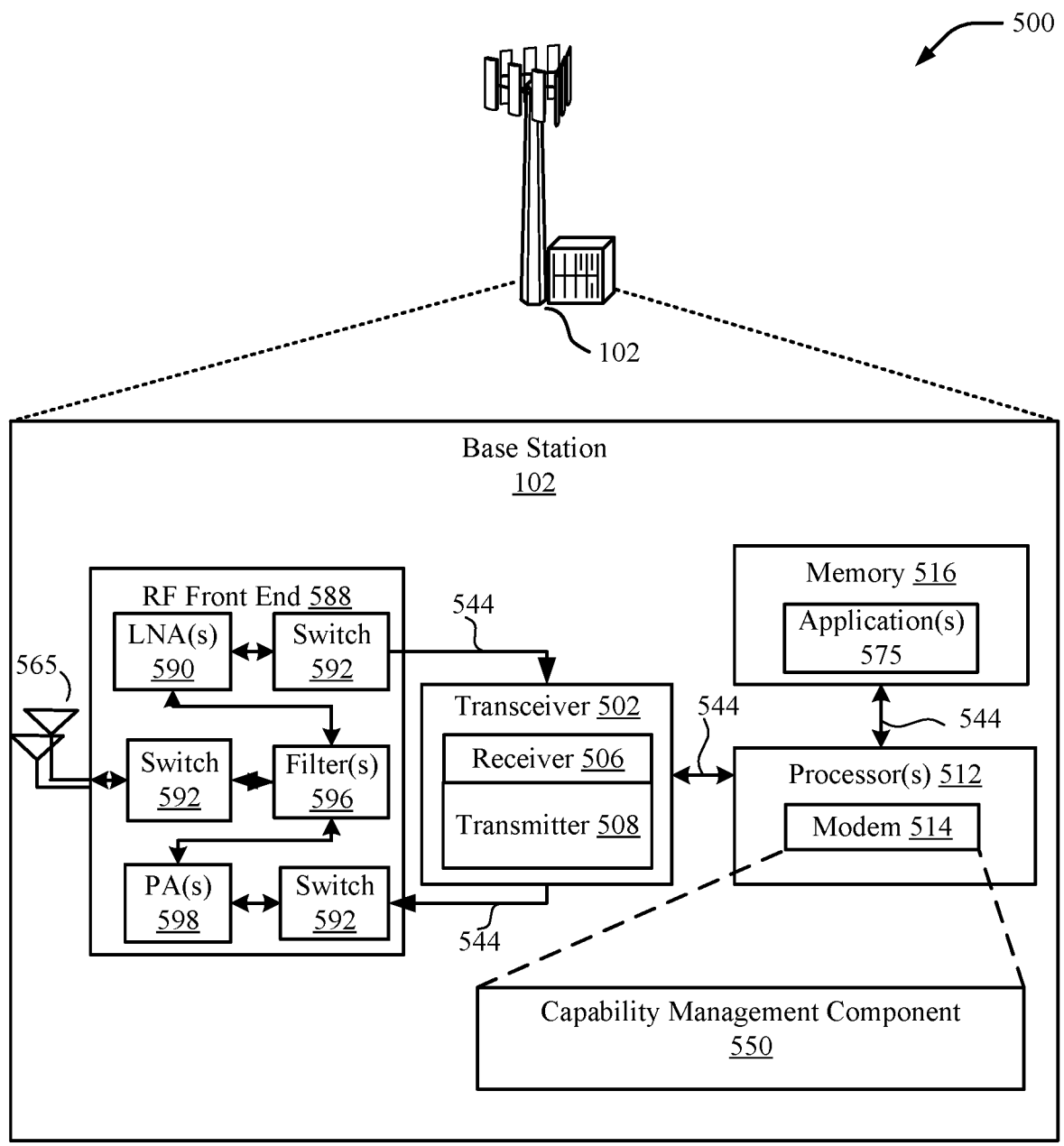
FIG. 5 illustrates an example of a schematic diagram of an aspect of an implementation of various components of a base station in accordance with various aspects of the present disclosure.

FIG. 5 illustrates a hardware components and subcomponents of a device that may be a base station 102 for implementing one or more methods (e.g., method 600) described herein in accordance with various aspects of the present disclosure. For example, one example of an implementation of the base station 102 may include a variety of components, some of which have already been described above, but including components such as one or more processors 512, memory 516 and transceiver 502 in communication via one or more buses 544, which may operate in conjunction with the capability management component 550 to perform functions described herein related to including one or more methods (e.g., 600) of the present disclosure.

The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 can include a modem 514 that uses one or more modem processors. The various functions related to capability management component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with capability management component 550 may be performed by transceiver 502.

The memory 516 may be configured to store data used herein and/or local versions of application(s) 575 or capability management component 550 and/or one or more of its subcomponents being executed by at least one processor 512. The memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining capability management component 550 and/or one or more of its subcomponents, and/or data associated therewith, when the UE 104 is operating at least one processor 512 to execute capability management component 550 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102 or wireless transmissions transmitted by UE 104. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 388. In an aspect, the transceiver 502 may be tuned to operate at specified frequencies such that transmitting device can communicate with, for example, one or more UEs 104 or one or more cells associated with one or more base stations 102. In an aspect, for example, the modem 514 can configure the transceiver 502 to operate at a specified frequency and power level based on the configuration of the transmitting device and the communication protocol used by the modem 514.

In an aspect, the modem 514 can be a multiband-multi-mode modem, which can process digital data and communicate with the transceiver 502 such that the digital data is sent and received using the transceiver 502. In an aspect, the modem 514 can be multiband and be configured to support multiple frequency bands for a specific communications protocol. In an aspect, the modem 514 can be multimode and be configured to support multiple operating networks and communications protocols. In an aspect, the modem 514 can control one or more components of transmitting device (e.g., RF front end 588, transceiver 502) to enable transmission and/or reception of signals from the network based on a specified modem configuration. In an aspect, the modem configuration can be based on the mode of the modem 514 and the frequency band in use. In another aspect, the modem configuration can be based on base station 104 configuration information associated with transmitting device as provided by the network during cell selection and/or cell reselection.

Figure 6:
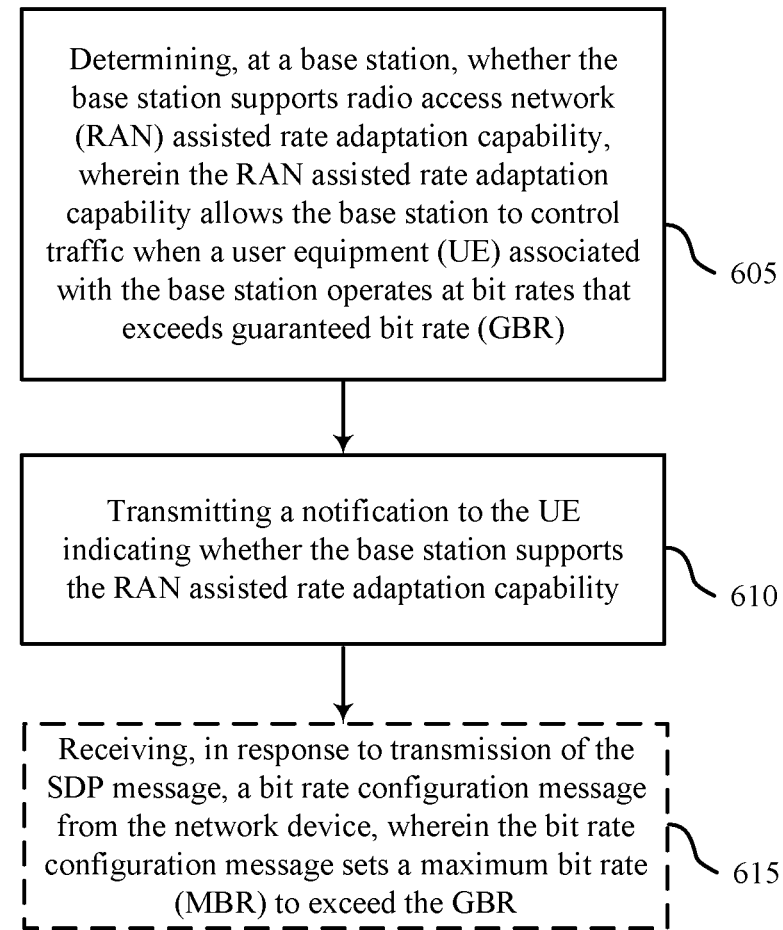
FIG. 6 illustrates an example of a method of wireless communication implemented by the base station in accordance with aspects of the present disclosure.

FIG. 6 is a flowchart of an example method 600 for wireless communications in accordance with aspects of the present disclosure. The method 600 may be performed by using the base station 102. Although the method 600 is described below with respect to the elements of the base station 102, other components may be used to implement one or more of the steps described herein.

At block 605, the method 600 may include determining, at a base station, whether the base station supports RAN assisted rate adaptation capability, wherein the RAN assisted rate adaptation capability allows the base station to control traffic when a UE associated with the base station operates at bit rates that exceed GBR. Aspects of block 605 may be performed by capability management component 550 described with reference to FIG. 5.

At block 610, the method 600 may include transmitting a notification to the UE indicating whether the base station supports the RAN assisted rate adaptation capability. Aspects of block 610 may be performed by transceiver 502 described with reference to FIG. 5.

At block 615, the method 600 may optionally include receiving, in response to transmission of the SDP message, a bit rate configuration message from the network device, wherein the bit rate configuration message sets a MBR to exceed the GBR. Aspects of block 615 may be performed by capability management component 550 described with reference to FIG. 5.

Figure 7:
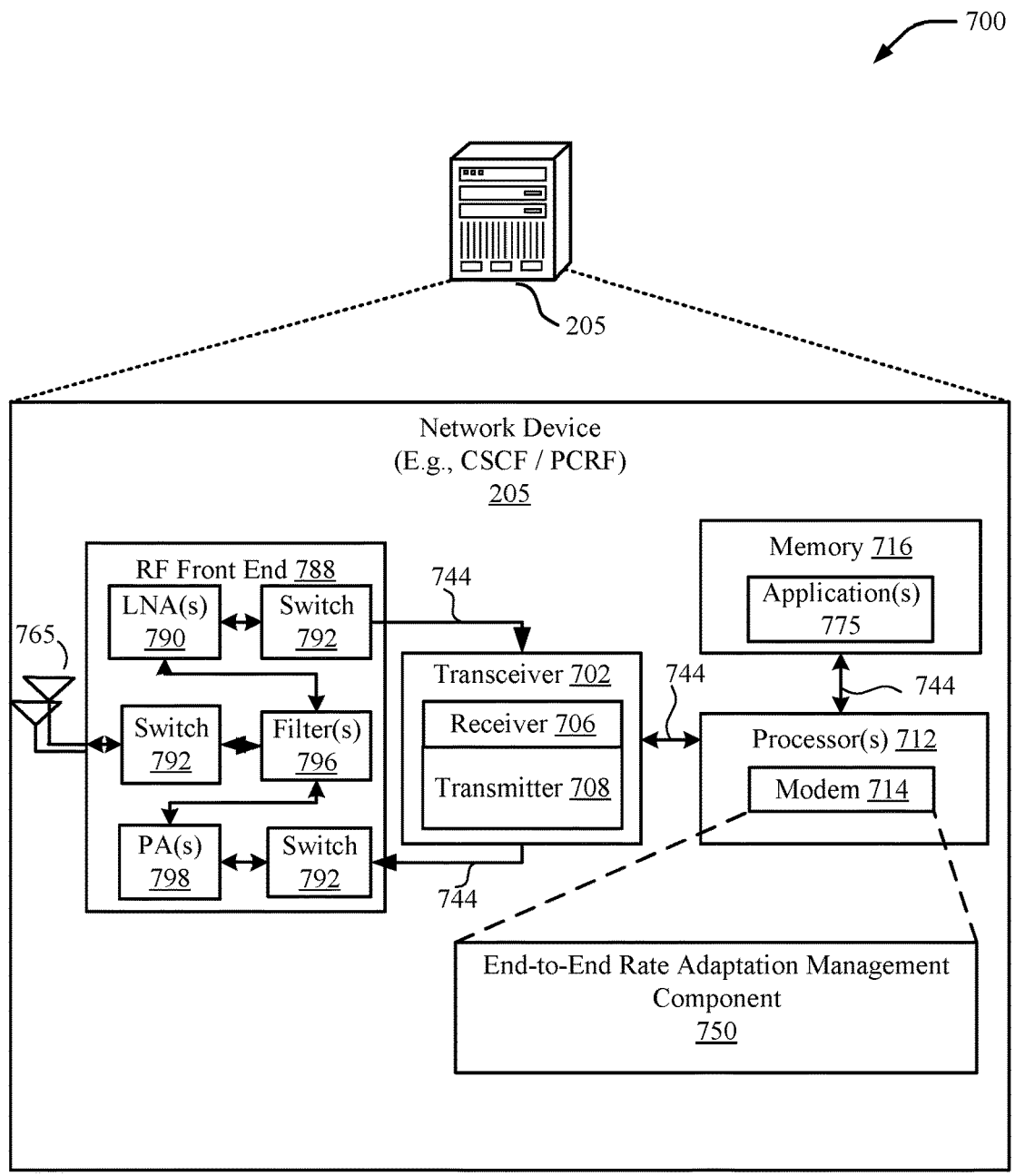
FIG. 7 illustrates an example of a schematic diagram of an aspect of an implementation of various components of a network device in accordance with various aspects of the present disclosure.

FIG. 7 illustrates a hardware components and subcomponents of a device that may be a network device 205 (e.g., CSCF and/or PCRF) for implementing one or more methods (e.g., method 700) described herein in accordance with various aspects of the present disclosure. For example, one example of an implementation of the network device 205 may include a variety of components, some of which have already been described above, but including components such as one or more processors 712, memory 716 and transceiver 702 in communication via one or more buses 744, which may operate in conjunction with the end-to-end rate adaptation management component 750 to perform functions described herein related to including one or more methods (e.g., 800) of the present disclosure.

The one or more processors 712, modem 714, memory 716, transceiver 702, RF front end 788 and one or more antennas 765, may be configured to support voice and/or data calls (simultaneously or non-simultaneously) in one or more radio access technologies. In an aspect, the one or more processors 712 can include a modem 714 that uses one or more modem processors. The various functions related to end-to-end rate adaptation management component 750 may be included in modem 714 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with end-to-end rate adaptation management component 750 may be performed by transceiver 702.

The memory 716 may be configured to store data used herein and/or local versions of application(s) 775 or end-to-end rate adaptation management component 750 and/or one or more of its subcomponents being executed by at least one processor 712. The memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, the memory 716 may be a non-transitory computer-readable storage medium that stores one or more computer-executable codes defining end-to-end rate adaptation management component 750 and/or one or more of its subcomponents, and/or data associated therewith, when the UE 104 is operating at least one processor 712 to execute end-to-end rate adaptation management component 750 and/or one or more of its subcomponents.

The transceiver 702 may include at least one receiver 706 and at least one transmitter 708. The receiver 706 may include hardware, firmware, and/or software code executable by a processor for receiving data, the code comprising instructions and being stored in a memory (e.g., computer-readable medium). The receiver 706 may be, for example, a radio frequency (RF) receiver. In an aspect, the receiver 706 may receive signals transmitted by at least one UE 104 and/or base station 102. Additionally, receiver 706 may process such received signals, and also may obtain measurements of the signals, such as, but not limited to, Ec/Io, SNR, RSRP, RSSI, etc. The transmitter 708 may include hardware, firmware, and/or software code executable by a processor for transmitting data, the code comprising instructions and being stored in a memory (e.g., computer-readable medium). A suitable example of the transmitter 708 may including, but is not limited to, an RF transmitter.

Moreover, in an aspect, transmitting device may include the RF front end 788, which may operate in communication with one or more antennas 765 and transceiver 702 for receiving and transmitting radio transmissions, for example, wireless communications transmitted by at least one base station 102 or wireless transmissions transmitted by UE 104. The RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, the LNA 790 can amplify a received signal at a desired output level. In an aspect, each LNA 790 may have a specified minimum and maximum gain values. In an aspect, the RF front end 788 may use one or more switches 792 to select a particular LNA 790 and its specified gain value based on a desired gain value for a particular application.

Further, for example, one or more PA(s) 798 may be used by the RF front end 788 to amplify a signal for an RF output at a desired output power level. In an aspect, each PA 795 may have specified minimum and maximum gain values. In an aspect, the RF front end 788 may use one or more switches 792 to select a particular PA 798 and its specified gain value based on a desired gain value for a particular application.

Also, for example, one or more filters 796 can be used by the RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, the RF front end 788 can use one or more switches 792 to select a transmit or receive path using a specified filter 796, LNA 790, and/or PA 798, based on a configuration as specified by the transceiver 702 and/or processor 712.

As such, the transceiver 702 may be configured to transmit and receive wireless signals through one or more antennas 765 via the RF front end 788. In an aspect, the transceiver 702 may be tuned to operate at specified frequencies such that transmitting device can communicate with, for example, one or more UEs 104 or one or more cells associated with one or more base stations 102. In an aspect, for example, the modem 714 can configure the transceiver 702 to operate at a specified frequency and power level based on the configuration of the transmitting device and the communication protocol used by the modem 714.

In an aspect, the modem 714 can be a multiband-multimode modem, which can process digital data and communicate with the transceiver 702 such that the digital data is sent and received using the transceiver 702. In an aspect, the modem 714 can be multiband and be configured to support multiple frequency bands for a specific communications protocol. In an aspect, the modem 714 can be multimode and be configured to support multiple operating networks and communications protocols. In an aspect, the modem 714 can control one or more components of transmitting device (e.g., RF front end 788, transceiver 702) to enable transmission and/or reception of signals from the network based on a specified modem configuration. In an aspect, the modem configuration can be based on the mode of the modem 714 and the frequency band in use. In another aspect, the modem configuration can be based on base station 104 configuration information associated with transmitting device as provided by the network during cell selection and/or cell reselection.

Figure 8:
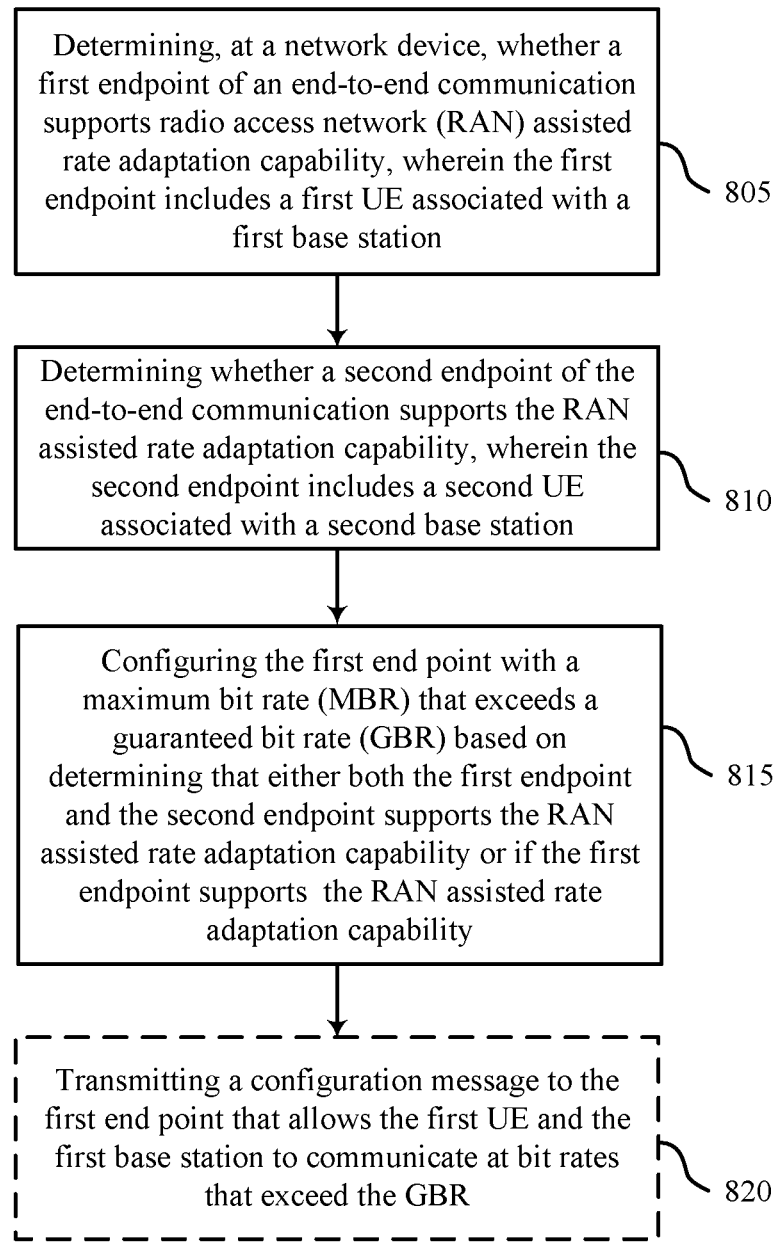
FIG. 8 illustrates an example of a method of wireless communication implemented by the network device in accordance with aspects of the present disclosure.

FIG. 8 is a flowchart of an example method 800 for wireless communications in accordance with aspects of the present disclosure. The method 800 may be performed using the network device 205. Although the method 800 is described below with respect to the elements of the network device 800, other components may be used to implement one or more of the steps described herein.

At block 805, the method 800 may include determining, at a network device, whether a first endpoint of an end-to-end communication supports radio access network (RAN)

assisted rate adaptation capability, wherein the first endpoint includes a first UE associated with a first base station. Aspects of block 805 may be performed by end-to-end rate adaptation management component 750 described with reference to FIG. 7.

At block 810, the method 800 may include determining whether a second endpoint of the end-to-end communication supports the RAN assisted rate adaptation capability, wherein the second endpoint includes a second UE associated with a second base station. Aspects of block 810 may be performed by end-to-end rate adaptation management component 750 described with reference to FIG. 7.

At block 815, the method 800 may include configuring the first end point with a MBR that exceeds a GBR based on determining that either both the first endpoint and the second endpoint supports the RAN assisted rate adaptation capability or if the first endpoint supports the RAN assisted rate adaptation capability. Aspects of block 815 may be performed by end-to-end rate adaptation management component 750 described with reference to FIG. 7.

At block 820, the method 800 may optionally include transmitting a configuration message to the first end point that allows the first UE and the first base station to communicate at bit rates that exceed the GBR. Aspects of block 815 may be performed by transceiver 702 described with reference to FIG. 7.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

Some Further Example Embodiments

An example method for wireless communications, comprising: determining, at a user equipment (UE), whether the UE supports radio access network (RAN) assisted rate adaptation capability, wherein the RAN assisted rate adaptation capability allows the UE to operate at bit rates that exceed guaranteed bit rate (GBR); configuring a session description protocol (SDP) parameter that indicates the RAN assisted rate adaptation capabilities of the UE; and transmitting a SDP message that includes the SDP parameter to a network device.

The above example method, further comprising: receiving, at the UE, a capability notification from a base station associated with the UE that identifies whether the base station supports RAN assisted rate adaptation capability; and determining, at the UE, whether the base station associated with the UE supports the RAN assisted rate adaptation capability based on the capability notification.

Any of the above example methods, the method may further comprise: receiving, in response to transmission of the SDP message, a bit rate configuration message from the network device, wherein the bit rate configuration message sets a maximum bit rate (MBR) to exceed the GBR.

Any of the above example methods, wherein the UE is a data source and transmits the data at the bit rates that exceed the GBR based on the bit rate configuration message.

In one or more of above example methods, wherein the UE is a data source UE, and wherein the SDP message is a SDP offer message.

Any of the above example methods, wherein the UE is a data consumer UE, and wherein the SDP message is a SDP answer message transmitted by the UE in response to a SDP offer message received from a data source UE indicating that the data source UE and the corresponding data source base station support the RAN assisted rate adaptation capability.

Any of the above example methods, the method may further comprise: receiving an access node bit rate (ANBR) message from the base station instructing the UE to reduce one or both of uplink or downlink bit rate when the bit rate exceeds GBR, wherein the ANBR message is transmitted by the base station when the base station is experiencing congestion on network.

An example user equipment (UE) for wireless communications comprising a memory configured to store instructions; a processor communicatively coupled with the memory, the processor configured to execute the instructions to: determine, at the UE, whether the UE supports radio access network (RAN) assisted rate adaptation capability, wherein the RAN assisted rate adaptation capability allows the UE to operate at bit rates that exceed guaranteed bit rate (GBR); configure a session description protocol (SDP) parameter that indicates the RAN assisted rate adaptation capabilities of the UE; and transmit a SDP message that includes the SDP parameter to a network device.

Any of the above example UE, the processor is further configured to: receive, at the UE, a capability notification from a base station associated with the UE that identifies whether the base station supports RAN assisted rate adaptation capability; and determine, at the UE, whether the base station associated with the UE supports the RAN assisted rate adaptation capability based on the capability notification.

Any of the above example UE, wherein the processor is further configured to: receive, in response to transmission of the SDP message, a bit rate configuration message from the network device, wherein the bit rate configuration message sets a maximum bit rate (MBR) to exceed the GBR.

Any of the above example UE, wherein the UE is a data source and transmits the data at the bit rates that exceed the GBR based on the bit rate configuration message.

Any of the above example UE, wherein the UE is a data source UE, and wherein the SDP message is a SDP offer message.

Any of the above example UE, wherein the UE is a data consumer UE, and wherein the SDP message is a SDP answer message transmitted by the UE in response to a SDP offer message received from a data source UE indicating that the data source UE and the corresponding data source base station support the RAN assisted rate adaptation capability.

Any of the above example UE, wherein the processor is further configured to: receive an access node bit rate (ANBR) message from the base station instructing the UE to reduce one or both of uplink or downlink bit rate when the bit rate exceeds GBR, wherein the ANBR message is transmitted by the base station when the base station is experiencing congestion on network.

An example non-transitory computer readable medium storing code for wireless communications, the code comprising instructions executable by a processor for: determining, at a user equipment (UE), whether the UE supports radio access network (RAN) assisted rate adaptation capability, wherein the RAN assisted rate adaptation capability allows the UE to operate at bit rates that exceed guaranteed bit rate (GBR); configuring a session description protocol (SDP) parameter that indicates the RAN assisted rate adaptation capabilities of the UE; and transmitting a SDP message that includes the SDP parameter to a network device.

Any of the above example computer readable medium, may further comprise instructions for: receiving, at the UE, a capability notification from a base station associated with the UE that identifies whether the base station supports RAN assisted rate adaptation capability; and determining, at the UE, whether the base station associated with the UE supports the RAN assisted rate adaptation capability based on the capability notification.

Any of the above example computer readable medium, may further comprise instructions for: receiving, in response to transmission of the SDP message, a bit rate configuration message from the network device, wherein the bit rate configuration message sets a maximum bit rate (MBR) to exceed the GBR.

Any of the above example computer readable medium, wherein the UE is a data source and transmits the data at the bit rates that exceed the GBR based on the bit rate configuration message.

Any of the above computer readable medium, wherein the UE is a data source UE, and wherein the SDP message is a SDP offer message.

Any of the above example computer readable medium, wherein the UE is a data consumer UE, and wherein the SDP message is a SDP answer message transmitted by the UE in response to a SDP offer message received from a data source UE indicating that the data source UE and the corresponding data source base station support the RAN assisted rate adaptation capability.

Any of the above example computer readable medium, further comprising: receiving an access node bit rate (ANBR) message from the base station instructing the UE to reduce one or both of uplink or downlink bit rate when the bit rate exceeds GBR, wherein the ANBR message is transmitted by the base station when the base station is experiencing congestion on network.

An example apparatus for wireless communications, comprising: means for determining, at a user equipment (UE), whether the UE supports radio access network (RAN) assisted rate adaptation capability, wherein the RAN assisted rate adaptation capability allows the UE to operate at bit rates that exceed guaranteed bit rate (GBR); means for configuring a session description protocol (SDP) parameter that indicates the RAN assisted rate adaptation capabilities of the UE; and means for transmitting a SDP message that includes the SDP parameter to a network device.

Any of the above example apparatus, comprising: means for receiving, at the UE, a capability notification from a base station associated with the UE that identifies whether the base station supports RAN assisted rate adaptation capability; and means for determining, at the UE, whether the base station associated with the UE supports the RAN assisted rate adaptation capability based on the capability notification.

Any of the above example apparatus, comprising: means for receiving, in response to transmission of the SDP message, a bit rate configuration message from the network device, wherein the bit rate configuration message sets a maximum bit rate (MBR) to exceed the GBR.

Any of the above example apparatus, wherein the UE is a data source and transmits the data at the bit rates that exceed the GBR based on the bit rate configuration message.

Any of the above example apparatus, wherein the UE is a data source UE, and wherein the SDP message is a SDP offer message.

Any of the above example apparatus, wherein the UE is a data consumer UE, and wherein the SDP message is a SDP answer message transmitted by the UE in response to a SDP offer message received from a data source UE indicating that the data source UE and the corresponding data source base station support the RAN assisted rate adaptation capability.

Any of the above example apparatus, comprising means for receiving an access node bit rate (ANBR) message from the base station instructing the UE to reduce one or both of uplink or downlink bit rate when the bit rate exceeds GBR, wherein the ANBR message is transmitted by the base station when the base station is experiencing congestion on network.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
    determining, at a user equipment (UE), whether the UE supports radio access network (RAN) assisted rate adaptation capability, wherein the RAN assisted rate adaptation capability allows the UE to operate at bit rates that exceed guaranteed bit rate (GBR);
    receiving, at the UE, a network capability notification from a base station associated with the UE, wherein the network capability notification indicates that the base station also supports the RAN assisted rate adaptation capability;
    configuring a session description protocol (SDP) parameter that indicates the RAN assisted rate adaptation capabilities of the UE; and
    transmitting a SDP message that includes the SDP parameter to a network device indicating that an endpoint supports the RAN assisted rate adaptation capability, the endpoint including one or both of the UE and the base station.

2. The method of claim 1, further comprising:
    receiving, in response to transmission of the SDP message, a bit rate configuration message from the network device, wherein the bit rate configuration message sets a maximum bit rate (MBR) to exceed the GBR.

3. The method of claim 2, wherein the UE is a data source and transmits the data at the bit rates that exceed the GBR based on the bit rate configuration message.

4. The method of claim 1, wherein the UE is a data source UE, and wherein the SDP message is a SDP offer message.

5. The method of claim 1, wherein the UE is a data consumer UE, and wherein the SDP message is a SDP answer message transmitted by the UE in response to a SDP offer message received from a data source UE indicating that the data source UE and corresponding data source base station support the RAN assisted rate adaptation capability.

6. The method of claim 1, further comprising:
    receiving an access node bit rate (ANBR) message from the base station instructing the UE to reduce one or both of uplink or downlink bit rate when the bit rate exceeds GBR, wherein the ANBR message is transmitted by the base station when the base station is experiencing congestion on network.

7. A user equipment (UE) for wireless communications, comprising:
    a memory configured to store instructions;
    a processor communicatively coupled with the memory, the processor configured to execute the instructions to:
        determine, at the UE, whether the UE supports radio access network (RAN) assisted rate adaptation capability, wherein the RAN assisted rate adaptation capability allows the UE to operate at bit rates that exceed guaranteed bit rate (GBR);
        receive, at the UE, a network capability notification from a base station associated with the UE, wherein the network capability notification indicates that the base station also supports the RAN assisted rate adaptation capability,
        configure a session description protocol (SDP) parameter that indicates the RAN assisted rate adaptation capabilities of the UE; and transmit a SDP message that includes the SDP parameter to a network device indicating that an endpoint supports the RAN assisted rate adaptation capability, the endpoint including one or both of the UE and the base station.

8. The UE of claim 7, wherein the processor is further configured to:
receive, in response to transmission of the SDP message, a bit rate configuration message from the network device, wherein the bit rate configuration message sets a maximum bit rate (MBR) to exceed the GBR.

9. The UE of claim 8, wherein the UE is a data source and transmits the data at bit rates that exceed the GBR based on the bit rate configuration message.

10. The UE of claim 7, wherein the UE is a data source UE, and wherein the SDP message is a SDP offer message.

11. The UE of claim 7, wherein the UE is a data consumer UE, and wherein the SDP message is a SDP answer message transmitted by the UE in response to a SDP offer message received from a data source UE indicating that the data source UE and corresponding data source base station support the RAN assisted rate adaptation capability.

12. The UE of claim 7, wherein the processor is further configured to:
receive an access node bit rate (ANBR) message from the base station instructing the UE to reduce one or both of uplink or downlink bit rate when the bit rate exceeds GBR, wherein the ANBR message is transmitted by the base station when the base station is experiencing congestion on network.

13. A non-transitory computer readable medium storing code for wireless communications, the code comprising instructions executable by a processor for:
determining, at a user equipment (UE), whether the UE supports radio access network (RAN) assisted rate adaptation capability, wherein the RAN assisted rate adaptation capability allows the UE to operate at bit rates that exceed guaranteed bit rate (GBR);
receiving, at the UE, a network capability notification from a base station associated with the UE, wherein the network capability notification indicates that the base station also supports the RAN assisted rate adaptation capability;
configuring a session description protocol (SDP) parameter that indicates the RAN assisted rate adaptation capabilities of the UE; and
transmitting a SDP message that includes the SDP parameter to a network device indicating that an endpoint supports the RAN assisted rate adaptation capability, the endpoint including one or both of the UE and the base station.

14. The non-transitory computer readable medium of claim 13, further comprising instructions for:
receiving, in response to transmission of the SDP message, a bit rate configuration message from the network device, wherein the bit rate configuration message sets a maximum bit rate (MBR) to exceed the GBR.

15. The non-transitory computer readable medium of claim 14, wherein the UE is a data source and transmits the data at the bit rates that exceed the GBR based on the bit rate configuration message.

16. The non-transitory computer readable medium of claim 13, wherein the UE is a data source UE, and wherein the SDP message is a SDP offer message.

17. The non-transitory computer readable medium of claim 13, wherein the UE is a data consumer UE, and wherein the SDP message is a SDP answer message transmitted by the UE in response to a SDP offer message received from a data source UE indicating that the data source UE and corresponding data source base station support the RAN assisted rate adaptation capability.

18. The non-transitory computer readable medium of claim 13, further comprising:
receiving an access node bit rate (ANBR) message from the base station instructing the UE to reduce one or both of uplink or downlink bit rate when the bit rate exceeds GBR, wherein the ANBR message is transmitted by the base station when the base station is experiencing congestion on network.

19. An apparatus for wireless communications, comprising:
means for determining, at a user equipment (UE), whether the UE supports radio access network (RAN) assisted rate adaptation capability, wherein the RAN assisted rate adaptation capability allows the UE to operate at bit rates that exceed guaranteed bit rate (GBR);
means for receiving, at the UE, a network capability notification from a base station associated with the UE, wherein the network capability notification indicates that the base station also supports the RAN assisted rate adaptation capability;
means for configuring a session description protocol (SDP) parameter that indicates the RAN assisted rate adaptation capabilities of the UE; and
means for transmitting a SDP message that includes the SDP parameter to a network device indicating that an endpoint supports the RAN assisted rate adaptation capability, the endpoint including one or both of the UE and the base station.

20. The apparatus of claim 19, further comprising:
means for receiving, in response to transmission of the SDP message, a bit rate configuration message from the network device, wherein the bit rate configuration message sets a maximum bit rate (MBR) to exceed the GBR.

21. The apparatus of claim 20, wherein the UE is a data source and transmits the data at the bit rates that exceed the GBR based on the bit rate configuration message.

22. The apparatus of claim 19, wherein the UE is a data source UE, and wherein the SDP message is a SDP offer message.

23. The apparatus of claim 19, wherein the UE is a data consumer UE, and
wherein the SDP message is a SDP answer message transmitted by the UE in response to a SDP offer message received from a data source UE indicating that the data source UE and corresponding data source base station support the RAN assisted rate adaptation capability.

* * * * *